United States Patent
Zillich et al.

(10) Patent No.: US 10,056,640 B2
(45) Date of Patent: Aug. 21, 2018

(54) BIPOLAR PLATE FOR FUEL CELL, FUEL CELL AND METHOD FOR PRODUCING THE BIPOLAR PLATE

(71) Applicant: Volkswagen AG, Wolfsburg (DE)

(72) Inventors: Christian Zillich, Braunschweig (DE); Mario Richter, Wolfsburg (DE)

(73) Assignee: Volkswagen AG, Wolfsburg (DE)

( * ) Notice: Subject to any disclaimer, the term of this patent is extended or adjusted under 35 U.S.C. 154(b) by 94 days.

(21) Appl. No.: 14/768,139

(22) PCT Filed: Mar. 10, 2014

(86) PCT No.: PCT/EP2014/054605
§ 371 (c)(1),
(2) Date: Aug. 14, 2015

(87) PCT Pub. No.: WO2014/139964
PCT Pub. Date: Sep. 18, 2014

(65) Prior Publication Data
US 2016/0006045 A1    Jan. 7, 2016

(30) Foreign Application Priority Data
Mar. 13, 2013  (DE) .................. 10 2013 204 308

(51) Int. Cl.
*H01M 8/02* (2016.01)
*H01M 8/04* (2016.01)
(Continued)

(52) U.S. Cl.
CPC ......... *H01M 8/241* (2013.01); *H01M 8/0202* (2013.01); *H01M 8/0258* (2013.01);
(Continued)

(58) Field of Classification Search
CPC combination set(s) only.
See application file for complete search history.

(56) References Cited

U.S. PATENT DOCUMENTS

2002/0182471 A1* 12/2002 Kralick ............... H01M 8/0221
429/509
2003/0096153 A1* 5/2003 Osenar ............... H01M 8/0247
429/457

(Continued)

FOREIGN PATENT DOCUMENTS

CN  101183723 A  10/2001
DE  100 15 360 A1  10/2001
(Continued)

*Primary Examiner* — Imran Akram
(74) *Attorney, Agent, or Firm* — Muncy, Geissler, Olds & Lowe, P.C.

(57) ABSTRACT

The invention relates to a bipolar plate for a fuel cell. The bipolar plate has a fuel side, an oxidant side, two individual plates and a coolant cavity arranged between the individual plates. At least one of the individual plates has at least one seal on the outer surface thereof. The individual plates are connected by way of at least one connecting seam. The bipolar plate is considered in that the at least one connecting seam does not intersect with or overlap with the at least one seal. The invention further relates to a fuel cell consisting at least one bipolar plate and to a method for producing the bipolar plate.

10 Claims, 3 Drawing Sheets

(51) Int. Cl.
*H01M 8/241* (2016.01)
*H01M 8/0202* (2016.01)
*H01M 8/0258* (2016.01)
*H01M 8/0271* (2016.01)
*H01M 8/0297* (2016.01)
*H01M 8/04007* (2016.01)

(52) U.S. Cl.
CPC ....... *H01M 8/0271* (2013.01); *H01M 8/0297* (2013.01); *H01M 8/04074* (2013.01)

(56) References Cited

U.S. PATENT DOCUMENTS

| | | | | |
|---|---|---|---|---|
| 2005/0091838 | A1* | 5/2005 | Frank | C25B 9/18 29/623.2 |
| 2005/0202303 | A1 | 9/2005 | Schlag | |
| 2006/0054664 | A1 | 3/2006 | Strobel et al. | |
| 2006/0127735 | A1* | 6/2006 | Sabin | H01M 8/0258 429/434 |
| 2007/0212587 | A1* | 9/2007 | Fragiadakis | F16J 15/14 429/483 |
| 2007/0238004 | A1* | 10/2007 | Osenar | H01M 8/0286 429/434 |
| 2009/0004547 | A1* | 1/2009 | Vitella | H01M 8/0247 429/457 |
| 2009/0325036 | A1* | 12/2009 | Blank | H01M 8/0202 429/514 |
| 2010/0068602 | A1* | 3/2010 | Wunderlich | H01M 8/0273 429/454 |
| 2010/0129725 | A1* | 5/2010 | Roy | H01M 8/0206 429/437 |
| 2011/0195332 | A1* | 8/2011 | Goebel | H01M 8/0232 429/465 |
| 2012/0107713 | A1* | 5/2012 | Miller | H01M 8/0247 429/457 |
| 2012/0231370 | A1* | 9/2012 | Rock | H01M 8/0247 429/508 |

FOREIGN PATENT DOCUMENTS

| | | |
|---|---|---|
| DE | 10015360 A | 10/2001 |
| DE | 103 45 147 A1 | 4/2004 |
| DE | 10 2005 057 044 A1 | 6/2007 |
| DE | 10 2005 057 045 A1 | 6/2007 |
| DE | 10 2006 058 335 A1 | 6/2008 |
| DE | 10 2011 009 805 A1 | 8/2011 |
| DE | 10 2011 117 095 A1 | 9/2012 |
| JP | 06176774 A | 6/1994 |
| JP | H 06176774 A | 6/1994 |
| JP | 2007 026737 A | 2/2007 |
| JP | 2007026737 A | 2/2007 |
| JP | 2007 073427 A | 3/2007 |
| JP | 2007073427 A | 3/2007 |
| JP | 2009 009911 A | 1/2009 |
| JP | 2009009911 A | 1/2009 |
| JP | 2009 099258 A | 5/2009 |
| JP | 2009099258 A | 5/2009 |
| JP | 2010-129459 A | 6/2010 |

\* cited by examiner

BIPOLAR PLATE FOR FUEL CELL, FUEL CELL AND METHOD FOR PRODUCING THE BIPOLAR PLATE

BACKGROUND OF THE INVENTION

Field of the Invention

The invention relates to a bipolar plate for a fuel cell, wherein the bipolar plate has a fuel side, an oxidant side, two individual plates and a coolant cavity arranged between the individual plates, at least one of the individual plates has, on its outer face, at least one seal and the individual plates are connected by means of at least one connecting seam. The invention also relates to a fuel cell comprising at least one bipolar plate and to a method for producing the bipolar plate.

Fuel cells use the chemical conversion of a fuel with oxygen to water to generate electrical energy. To that end, fuel cells comprise, as core component, what is termed the membrane electrode assembly (MEA) which is a construct of an ion-conducting, in particular proton-conducting, membrane, and in each case an electrode (anode and cathode) arranged on either side of the membrane. In addition, gas diffusion layers (GDL) can be arranged on either side of the membrane electrode assembly, on those sides of the electrodes which are oriented away from the membrane. Generally, the fuel cell consists of a multiplicity of stacked MEAs whose electrical power adds up. When the fuel cell is in operation, the fuel, in particular hydrogen $H_2$ or a hydrogen-containing gas mixture, is supplied to the anode, where electrochemical oxidation of $H_2$ to $H^+$ takes place with loss of electrons. The electrolytes or the membrane, which provide gas-tight separation and electrical insulation of the reaction areas with respect to one another, transport the protons $H^+$ (in a water-bound or a water-free manner) from the anode area into the cathode area. The electrons provided at the anode are conducted to the cathode via an electrical line. The cathode is supplied with oxygen or an oxygen-containing gas mixture, such that reduction of $O_2$ to $O^{2-}$ takes place with addition of the electrons. At the same time, these oxygen anions react in the cathode area with the protons transported via the membrane, forming water. By the direct conversion of chemical energy to electrical energy, fuel cells achieve better efficiency in comparison to other electricity generators by virtue of circumventing the Carnot factor.

The currently most developed fuel cell technology is based on polymer electrolyte membranes (PEM) in which the membrane itself consists of a polymer electrolyte. In this context, use is often made of acid-modified polymers, in particular perfluorinated polymers. The most widespread representative of this class of polymer electrolytes is a membrane made of a sulfonated polytetrafluoroethylene copolymer (trade name: Nafion; copolymer of tetrafluoroethylene and a sulfonyl fluoride derivative of a perfluoroalkyl vinyl ether). In that context, the electrolytic conduction takes place via hydrated protons, for which reason the presence of water is a condition for the proton-conductivity and, when the PEM fuel cell is in operation, it is necessary to wet the operating gases. On account of the need for water, the maximum operating temperature of these fuel cells at standard pressure is restricted to below 100° C. In contrast to high-temperature polymer electrolyte membrane fuel cells (HT-PEM fuel cells), whose electrolytic conductivity is based on an electrolyte which is bound by electrostatic complex formation to a polymer scaffold of the polymer electrolyte membrane (for example phosphoric acid-doped polybenzimidazole (PBI) membranes) and which is operated at temperatures of 160° C., this fuel cell type is also termed a low-temperature polymer electrolyte membrane fuel cell (LT-PEM fuel cell).

The fuel cell consists of a multiplicity of stacked individual cells, such that it is also possible to refer to a fuel cell stack. Between the membrane electrode assemblies there are arranged bipolar plates which ensure that the individual cells are supplied with the operating media, that is to say the reactants, and a cooling liquid. In addition, the bipolar plates ensure electrically conductive contact with the membrane electrode assemblies.

Between the membrane electrode assemblies and the bipolar plates there are arranged seals which seal the anode areas and the cathode areas with respect to the outside and prevent the operating media from leaking out of the fuel cell. The seals can be provided on the side of the membrane electrode assemblies or of the bipolar plates and in particular can be connected to these components. In addition, the seals can also take the form of insert seals, without being secured on the bipolar plates or the membrane electrode assemblies.

Description of Related Art Including Information Disclosed Under 37 CFR § 1.97 and § 1.98

Metallic bipolar plates of fuel cells conventionally consist of two individual plates (halves) which are connected to one another by welding. DE 102011009805 A1 and DE 102011117095 A1 describe bipolar plates onto which polymer seals are affixed and whose individual plates are connected to one another by seam welding.

Currently, the individual plates are first welded and only then provided with a seal, since it is not possible to weld through the seal. However, if it is necessary, when affixing the seal onto the bipolar plate, to use pressure, as e.g. when injection molding, there is the risk of damage to the bipolar plate in areas in which the halves of the bipolar plate are separated from one another by gaps. If pressure-free methods, such as adhesive bonding, are used, the reliable process handling of the seal is very onerous. Reducing the pressure when affixing the seal is intended to prevent overloading the bipolar plate. Since e.g. in the case of injection molding certain minimum pressures are required, on account of the viscosity of the seal material, for affixing the seal, reducing the injection pressure greatly reduces the choice of seal materials which can be used.

On the other hand, the seals can also be affixed to the membranes of the fuel cell. In that context, the thermal and mechanical strength of the membrane limits the production process of the seal, which leads to long process times and high reject rates. In order not to damage the membrane, moderate operating parameters are accordingly chosen. This restricts on one hand the number of seal materials which can be used and on the other hand leads to long process times.

BRIEF SUMMARY OF THE INVENTION

The invention is now based on the object of providing a bipolar plate and a method for producing the bipolar plate, by means of which reject costs and the time required for manufacturing a fuel cell can be reduced.

This object is achieved with a bipolar plate for a fuel cell, wherein the bipolar plate has a fuel side, an oxidant side, two individual plates and a coolant cavity arranged between the individual plates, at least one of the individual plates has, on its outer face, at least one seal and the individual plates are connected by means of at least one connecting seam. The characterizing feature is that the at least one connecting seam neither crosses nor overlaps the at least one seal.

The fuel side and the oxidant side of the bipolar plate are those sides which, when the bipolar plate is in operation within a fuel cell, are in contact with oxidant or fuel. A suitable fuel is in particular hydrogen $H_2$ and, as oxidant, oxygen $O_2$, which is made available to the fuel cell in particular by supplying air.

In that context, the outer face denotes a side (a flat side), oriented away from the coolant cavity, of the respective individual plate. The at least one seal is connected to the bipolar plate, in that the seal is affixed to the bipolar plate, in particular injected thereon. In operation, the seal seals a transition (gap) between the bipolar plate and a membrane of the fuel cell, in particular circumferentially. Within the context of the invention, the term "seal" is to be understood as a seal which bounds, in particular circumferentially, an area on a bipolar plate. The connecting seam, by contrast, seals a gap between the individual plates of the bipolar plate, in particular circumferentially.

That the at least one connecting seam and the at least one seal do not cross, overlap and/or touch means that these are spaced apart from one another over in particular their entire lengths, as seen in a plan view normal to the main faces of the bipolar plate, wherein in particular the separation can also, at the limit, be essentially equal to zero. In that context, in particular none of the connecting seams overlaps and/or crosses a seal. Specifically, in particular none of the connecting seams overlaps and/or crosses a circumferential seal. In other words, the seal is not overlapped and/or crossed by a connecting seam, at least in those areas which have a sealing function within the fuel cell.

Preferably, the individual plates are sheets and/or the connecting seams are weld seams. By using individual plates made of (metallic) sheets, which are connected by means of weld seams, it is possible to produce bipolar plates in a cost-effective manner.

The invention makes it possible to first affix, onto the bipolar plates, the seals necessary for a fuel cell, that is to affix the seals to the individual plates (halves) of the bipolar plates and to then connect—in particular weld—the individual plates. This ensures that an area on which the seal runs can be mechanically stabilized in order to prevent deformation of the individual plate when affixing the seal, e.g. by means of an injection molding method. The production of the bipolar plates, in which first the seal is affixed to the halves and only then are the halves welded, is only made possible by the fact that the seal and weld seam paths do not cross or even lie atop one another, since if they did it would no longer be possible to weld the halves. This allows a more flexible and faster production of the seal and of the bipolar plate. The production process for the seal no longer needs to be guided by the low strengths of the membrane or the low pressure stability of areas of a bipolar plate which has already been welded together, which areas have gaps between the individual plates. Such an arrangement of the seal and weld seam paths was not known from the prior art. Hence, the approach hitherto was to circumvent the problem.

According to a preferred configuration of the invention, it is provided that the bipolar plate has at least one fuel opening which passes through the bipolar plate, wherein the at least one seal comprises at least one fuel seal arranged at least on the oxidant side, the at least one connecting seam comprises at least one fuel connecting seam, and the at least one fuel opening is circumferentially enclosed by the at least one fuel seal and the at least one fuel connecting seam. Preferably, the bipolar plate comprises at least two fuel openings which in particular are each circumferentially enclosed by at least one fuel seal and a fuel connecting seam.

According to a further preferred configuration of the invention, it is provided that the bipolar plate has at least one oxidant opening which passes through the bipolar plate, wherein the at least one seal comprises at least one oxidant seal arranged at least on the fuel side, the at least one connecting seam comprises at least one oxidant connecting seam, and the at least one oxidant opening is circumferentially enclosed by the at least one oxidant seal and the at least one oxidant connecting seam. Preferably, the bipolar plate comprises at least two oxidant openings which in particular are each circumferentially enclosed by at least one oxidant seal and an oxidant connecting seam.

The fuel and oxidant openings serve for feeding the fuel and the oxidant, that is to say the reactants, through the bipolar plate within a fuel cell. The fuel seal on the oxidant side ensures that the fuel does not enter into an oxidant area on the oxidant side, or into the environment. In analogous fashion, the oxidant seal on the fuel side ensures that the oxidant does not enter into a fuel area on the fuel side, or into the environment. The fuel and oxidant connecting seams serve to seal the coolant cavity with respect to the fuel and oxidant openings.

According to a further preferred configuration of the invention, it is provided that the bipolar plate has at least one coolant opening which passes through the bipolar plate and which is fluidically connected to the coolant cavity, wherein the at least one seal comprises coolant seals arranged on both sides of the bipolar plate, which circumferentially enclose the at least one coolant opening. Preferably, the bipolar plate comprises at least two coolant openings which in particular are each circumferentially enclosed on either side of the bipolar plate by coolant seals. The coolant openings serve for feeding the coolant through the bipolar plate within a fuel cell. The coolant seal ensures that the coolant does not enter into the fuel or oxidant areas, or into the environment.

The fuel and oxidant connecting seams seal off, circumferentially, an area between the individual plates around the respective openings. In operation, the fuel, oxidant and coolant seals seal off, circumferentially, an area between the bipolar plate and the adjoining membranes of the fuel cell.

It is preferably provided that the at least one seal comprises at least one fuel seal which circumferentially encloses the at least one fuel opening on the fuel side. Further preferably, the at least one fuel seal is arranged between the at least one fuel connecting seam and the at least one fuel opening, and between the fuel seal and the fuel connecting seam there is arranged at least one cutout which passes through the individual plate on the fuel side. In particular, on the fuel side, at least two fuel openings are enclosed by in each case one fuel seal.

According to a further preferred configuration of the invention, it is provided that the at least one seal comprises at least one oxidant seal which circumferentially encloses the at least one oxidant opening on the oxidant side. Further preferably, the at least one oxidant seal is arranged between the at least one oxidant connecting seam and the at least one oxidant opening, and between the oxidant seal and the oxidant connecting seam there is arranged at least one cutout which passes through the individual plate on the oxidant side. In particular, on the oxidant side, at least two oxidant openings are enclosed by in each case one oxidant seal.

In operation, the fuel seal on the fuel side and the oxidant seals on the oxidant side seal off, circumferentially, an area between the bipolar plate and the adjoining membranes of the fuel cell. A more exact metering of the fuel and/or of the oxidant in the fuel and/or oxidant areas is thereby possible. The effect of the preferred arrangement of the fuel and/or oxidant seals within the fuel and oxidant connecting seams, in conjunction with the cutouts, is that the charging of the fuel and oxidant areas can be influenced by the cross section areas of the cutouts. The fuel and the oxidant thus flow, separately and proceeding from the respective openings, between the individual plates, then through the cutouts and thus enter the respective fuel or oxidant area. This is preferably the case for in each case at least two fuel and/or oxidant openings.

It is preferably provided that the at least one connecting seam comprises a coolant connecting seam which circumferentially encloses the coolant cavity and in particular the coolant seals of the at least one coolant opening. The coolant connecting seam bounds, between the individual plates, the coolant cavity and circumferentially seals the latter off. The coolant seals and thus the coolant openings are arranged within the coolant connecting seam, in order to ensure a supply of coolant to the coolant cavity via the coolant openings.

It is preferably provided that the at least one seal comprises a fuel area seal which circumferentially encloses a fuel area on the fuel side and in particular the at least one fuel connecting seam.

It is further preferably provided that the at least one seal comprises an oxidant area seal which circumferentially encloses an oxidant area on the oxidant side and in particular the at least one oxidant connecting seam.

The area seals seal off, circumferentially, the respective fuel or oxidant area on the individual plates. The fuel and/or oxidant area seal ensures that the fuel and/or oxidant areas are separated with respect to one another, with respect to the coolant and/or with respect to the environment.

The fuel area and/or the oxidant area can have ducts which are open to the outside and via which the fuel and/or the oxidant is distributed in the respective area.

The arrangement of the area seals in relation to the coolant connecting seam can in principle be as follows, without the area seals, which run on opposite sides of the bipolar plate, intersecting the connecting seam:
  both area seals are enclosed by the coolant connecting seam;
  both area seals enclose the coolant connecting seam; or
  one of the area seals is enclosed by the coolant connecting seam while the other area seal encloses the coolant connecting seam, wherein this arrangement does not have the symmetry of the above arrangements.

Preferably, multiple connecting seams are formed integrally in one piece with one another. This is possible if no seal runs between them. Equally, multiple seams are preferably formed integrally in one piece with one another on the same side of the bipolar plate. This is possible if no connecting seam runs between them. These configurations permit a more compact arrangement of the connecting seams and/or seals.

Preferably, the coolant connecting seam circumferentially encloses at least one of the area seals. In particular, the coolant connecting seam encloses all other connecting seams and seals. This results in greater flexibility of the arrangement of the seals.

Preferably, the coolant seals of at least one coolant opening are arranged outside the at least one circumferentially enclosed area seal. There is thus no risk of the fuel and/or the oxidant passing into the coolant via this coolant opening, since the fuel and/or the oxidant can escape into the environment. In particular, (all of) the coolant seals are arranged outside the circumferentially enclosed area seal.

Preferably, the fuel connecting seams are arranged within the oxidant area seal. Preferably, the oxidant connecting seams are arranged within the fuel area seal. This results in an increased area enclosed by the area seals.

Alternatively, at least one of the area seals can circumferentially enclose the coolant connecting seam.

According to a preferred configuration of the invention, it is provided that at least one of the area seals circumferentially encloses the coolant connecting seam and the coolant connecting seam is made integrally (in one piece) with at least one of the fuel connecting seams and/or with at least one of the oxidant connecting seams, as a combined connecting seam. In particular, (all of) the fuel connecting seams and oxidant connecting seams are made integrally with the coolant connecting seam. This results in a most compact arrangement of the connecting seams.

Preferably, on opposite sides of the fuel area and of the oxidant area there is arranged in each case at least one fuel unit, oxidant unit and coolant unit. In particular, the coolant unit is arranged between the fuel unit and the oxidant unit.

Bipolar plates according to the invention may preferably also be used for electrolyzers.

Furthermore, a fuel cell is provided which comprises at least one bipolar plate and at least two membrane electrode assemblies, wherein the bipolar plate is arranged between the membrane electrode assemblies. Preferably, the fuel cell comprises a multiplicity of bipolar plates and membrane electrode assemblies stacked alternately. The fuel cell according to the invention can also be termed a fuel cell stack and is in particular characterized by its reduced costs on account of improved producibility. The at least one seal seals a transition between the bipolar plate and the membrane. Such fuel cells may preferably be used in motor vehicles for providing electrical drive energy.

Further provided is a method for producing a bipolar plate according to the invention, wherein the method comprises the following steps:
  producing the seals on the individual plates;
  producing the connecting seams between the individual plates.

Preferably, the seals are produced on the individual plates by means of an injection molding method. Preferably, to that end, a starting material is injected onto the individual plates within an injection molding tool. In this case, the production of the seals generally comprises a step of curing the starting material for the seals.

In a further preferred case, the seals are produced on the individual plates by means of a screen printing method. The screen printing method also represents an established method for producing the seals.

Preferably, the connecting seams are produced by means of a welding method, in particular by means of a laser welding method. In that context, a laser beam is incident on one side of the bipolar plate, whereby the individual plate acted on by the laser beam is welded to the second individual plate lying behind it.

It is preferably provided that the production of the seal takes place temporally prior to the production of the connecting seams. It is thus possible for the individual plates, during production of the seals, to be optimally supported, on that side of the individual plates oriented away from the seals, by a tool, e.g. an injection molding tool. This prevents deformations of the bipolar plate and reduces reject costs. In addition, the support makes it possible to work with higher pressures, e.g. during injection molding, which reduces the production time for the seals and also permits a greater selection of seal materials.

The invention will be explained in more detail below in exemplary embodiments and with reference to the associated drawings, in which:

DETAILED DESCRIPTION OF THE INVENTION

Figure 1:
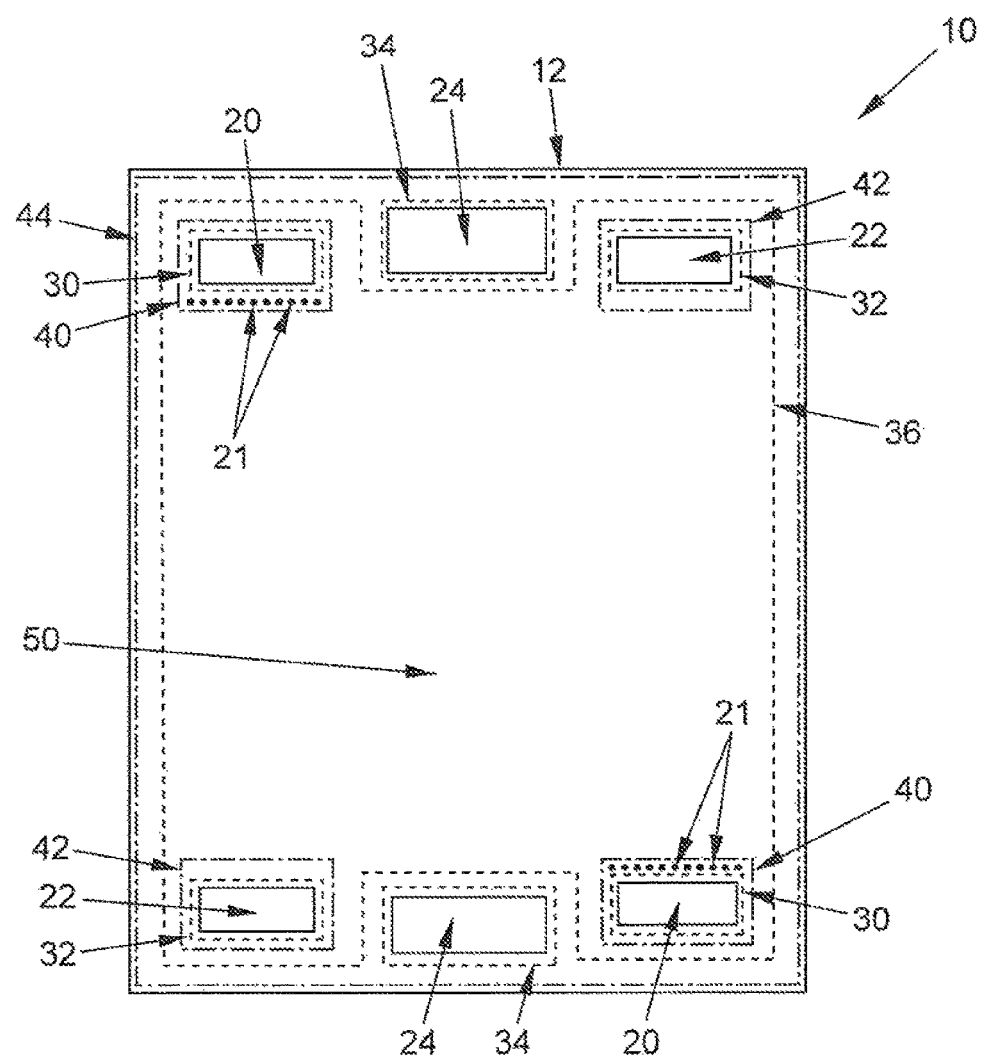
FIG. 1 shows a bipolar plate with a coolant connecting seam enclosing the area seals.
Figure 2:
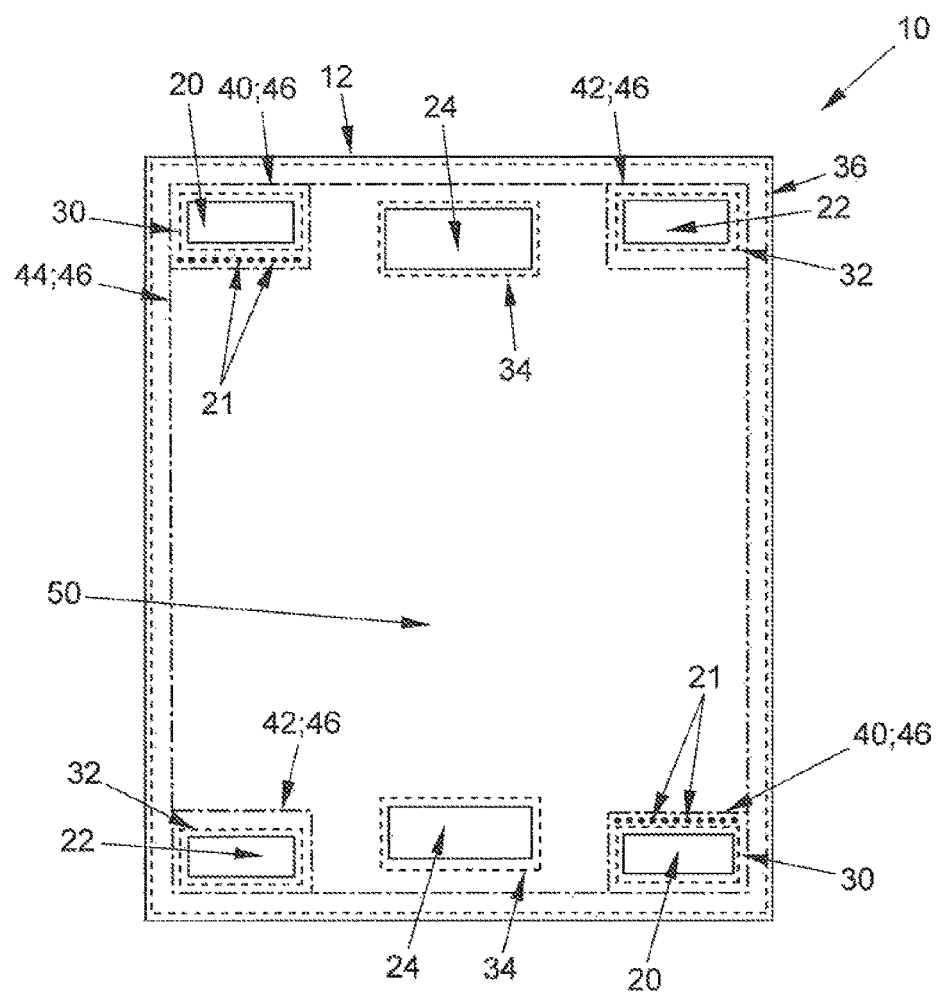
FIG. 2 shows a bipolar plate with a coolant connecting seam enclosed by the area seals.

The bipolar plates 10 shown in FIGS. 1 and 2 can be made essentially symmetric, with respect to a plane of symmetry that runs between two individual plates 12 of the bipolar plate 10, in particular in relation to the seals. Thus, the normal projections of seals on both sides 14, 16 (main faces) of the bipolar plate 10 are essentially of equal surface area. The seals (or their paths) are represented schematically as dashed lines and the connecting seams (or their paths) are represented schematically as dashed-dotted lines.

FIG. 1 shows a plan view of one of the flat sides of the schematically represented bipolar plate 10, wherein the view is oriented towards the fuel side 14 of the bipolar plate 10. The oxidant side 16 of the bipolar plate 10 is that flat side of the bipolar plate 10 opposite the fuel side 14.

Figure 3:
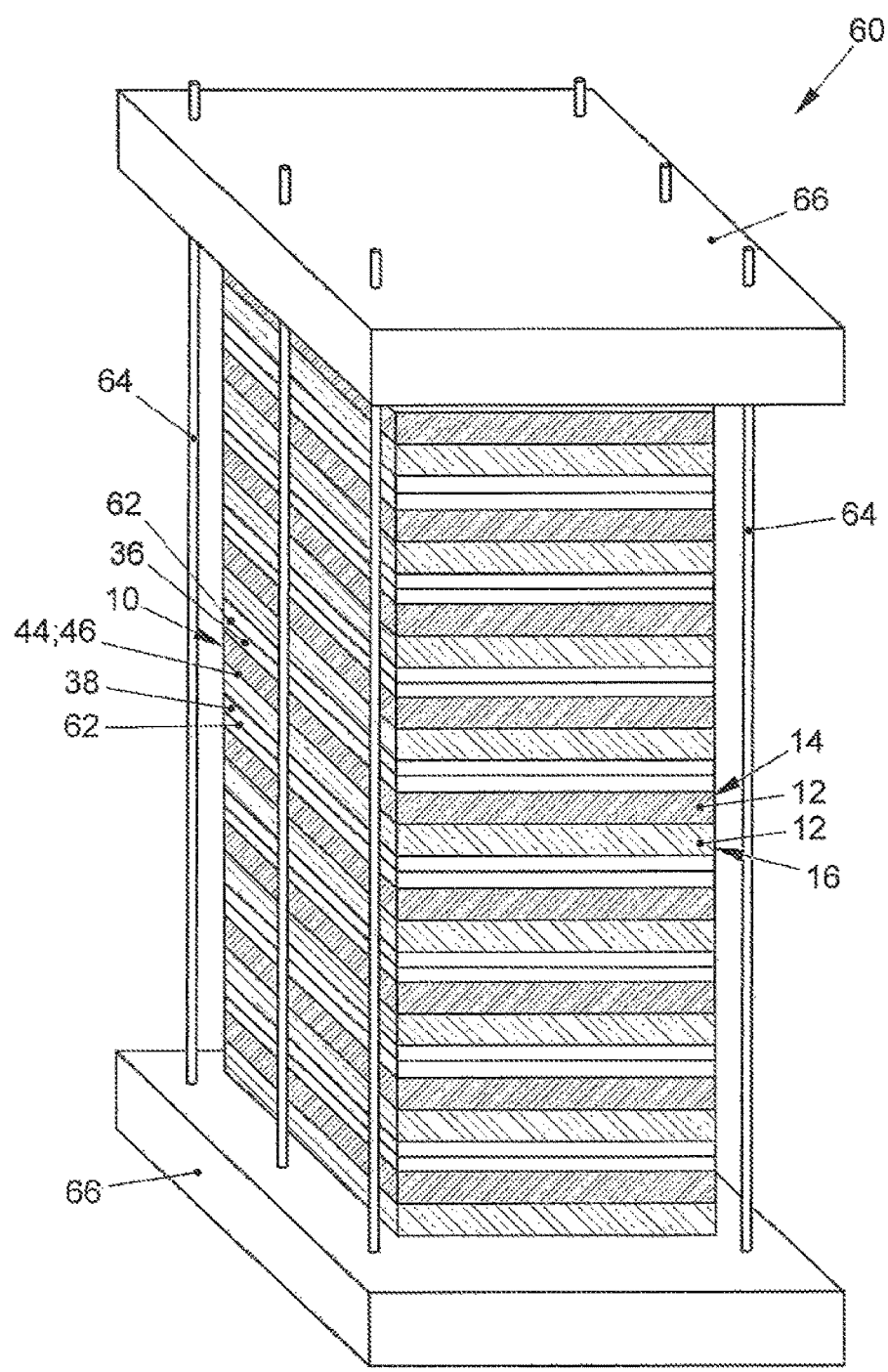
FIG. 3 is a schematic representation of a fuel cell.

The bipolar plate 10 has a coolant connecting seam 44 which circumferentially encloses the fuel area seal 36 and the oxidant area seal 38 (see FIG. 3). The coolant connecting seam 44 represents an outer limit of a coolant cavity within the bipolar plate 10 between the two individual plates 12. Since the coolant connecting seam 44 seals with respect to the environment, it can also be termed an outer weld seam. In analogous fashion, the area seals 36, 38 can be termed outer seals.

The coolant connecting seam 44 also encloses coolant openings 24 and coolant seals 34. The coolant seal 34 also seals with respect to the environment and can therefore also be termed an outer seal. The coolant openings 24 are fluidically connected to the coolant cavity between the two individual plates 12. The coolant seals 34 circumferentially enclose the coolant openings 24 and are arranged between the coolant connecting seam 44 and the area seals 36, 38. Thus, the coolant seals 34 are arranged outside the area seals 36, 38, which has the effect that fuel or oxidant cannot pass into the cooling circuit via the coolant seals 34.

The fuel area seal 36 encloses a fuel area 50 while on the opposite flat side of the bipolar plate 10 the oxidant area seal 38 encloses an oxidant area (not shown). The fuel area 50 and the oxidant area correspond, within a fuel cell stack, to a chemically active area.

In addition, the area seals 36, 38 enclose fuel connecting seams 40 which in each case circumferentially enclose a fuel seal 30. The fuel seals 30 in turn enclose in each case a fuel opening 20. Furthermore, the area seals 36, 38 enclose oxidant connecting seams 42 which in each case circumferentially enclose an oxidant seal 32. The oxidant seals 32 in turn enclose in each case an oxidant opening 22. The fuel seals 30 and the oxidant seals 32 can be termed inner seals, since they seal individual operating media with respect to one another. Equally, the fuel connecting seams 40 and the oxidant connecting seams 42 can be termed inner connecting seams since they also seal the individual operating media with respect to one another.

In the example, the fuel seals 30 and the oxidant seals 32 run within the fuel connecting seams 40 and the oxidant connecting seams 42. The fuel units also comprise, on the shown fuel side 14, cutouts 21 between the fuel seals 30 and the fuel connecting seams 40. The cutouts 21 pass through the individual plate 12 oriented towards the fuel side 14 and thus establish fluidic connections between the fuel openings 20 and the fuel area 50. On the oxidant side 16 (not shown) too, there are such cutouts 21 between the oxidant seals 32 and the oxidant connecting seams 40. In that context, the cutouts 21 pass through the individual plate 12 oriented towards the oxidant side 16 and thus establish a fluidic connection between the oxidant openings 22 and the oxidant area (not shown).

FIG. 2 shows a further preferred configuration of the invention. In contrast to FIG. 1, the fuel area seal 36 and the oxidant area seal 38 (see FIG. 3) circumferentially enclose the coolant connecting seam 44. The consequence of this is that the coolant connecting seam 44, the fuel connecting seam 40 and the oxidant connecting seam 42 are arranged adjacent to one another, without one of the area seals 32 running between them. It is thus possible for the connecting seams 40, 42, 44 to be made integrally as a combined connecting seam 46, as depicted. The combined connecting seam 46 can thus be termed on one hand as an outer, and on the other hand also as an inner, connecting seam. Since according to this exemplary embodiment the coolant connecting seam 44 runs within the fuel area seal 36 and the oxidant area seal 38, it is also possible for the coolant seal 34 to no longer be arranged outside the area seals 36.

The seals 30, 32, 34, 36 of FIGS. 1 and 2 are connected to the individual plates 12. Within a fuel cell 60, (cf. FIG. 3), the seals 30, 32, 34, 36 seal a gap between the bipolar plate 10 and the adjoining membrane electrode assemblies 62. Each of the connecting seams 40, 42, 44 connects the two individual plates 12 to one another and circumferentially seals a gap between the individual plates 12.

As shown in FIGS. 1 and 2, the above-described arrangements of the seals 30, 32, 34, 36 and of the connecting seams 40, 42, 44 have made it possible to produce bipolar plates 10 whose connecting seams 40, 42, 44 neither cross nor overlap the seals 30, 32, 34, 36, which brings considerable advantages with respect to the production of the bipolar plate 10.

FIG. 3 shows, in a schematic representation, a fuel cell 60 comprising multiple membrane electrode assemblies 62. The membrane electrode assemblies 62 are stacked alternately with bipolar plates 10 according to the invention as shown in FIG. 2 to give a fuel cell 60 (that is to say to give a fuel cell stack).

The bipolar plates 10 supply the membrane electrode assemblies 62, via gas diffusion layers, with the reactants, that is to say the fuel (for example hydrogen) and the oxidant (for example oxygen from air), to which end suitable ducts can be provided in the bipolar plates 10. In addition, the bipolar plates 10 connect two adjoining membrane electrode assemblies 62 in an electrically conductive manner, such that these are connected in series.

The seals 30, 32, 34, 36 of the bipolar plates 10 seal off the spaces between the membrane electrode assemblies 62, in particular the membranes and the bipolar plates 10, and thus prevent the operating media from leaking out of the fuel cell 60 during operation. The schematically represented coolant connecting seam 44 or, as the case may be, combined connecting seam 46 prevents the coolant from leaking out of the fuel cell 60.

In order to ensure correct operation of the seals 30, 32, 34, 36 and electrically conductive contact between the bipolar plates 10 and the membrane electrode assemblies 62 even under vibrations, (e.g. as a consequence of use in a motor vehicle), the fuel cell 60 is typically compressed. This is generally effected by means of two end plates 66 which are arranged at either end of the fuel cell 60, in combination with multiple tension elements 64. The tension elements 64 convey tension forces into the end plates 66, such that the end plates 66 compress the fuel cell 60.

A method for producing a bipolar plate as shown in FIGS. 1 and 2 is discussed below with reference to a preferred configuration:

First, the fuel seals 30, the oxidant seals 32, the coolant seals 34 and the fuel area seal 36 are produced on that individual plate 12 which is later to be arranged on the fuel side 14 of the bipolar plate 10. In addition, the fuel seals 30, the oxidant seals 32, the coolant seals 34 and the oxidant area seal 38 are produced on that individual plate 12 which is later to be arranged on the oxidant side 16 of the bipolar plate 10. The production of the seals 30, 32, 34, 36 on the individual plates 12 can for example be effected by means of an injection molding method. Typically, to that end, a starting material is injected onto the individual plates 12 within an injection molding tool. In this case, the production of the seals 30, 32, 34, 36 typically comprises a step of curing the starting material of the seals 30, 32, 34, 36.

Then, the individual plates 12 are positioned with respect to one another such that those sides of the individual plates 12 opposite the seals 30, 32, 34, 36 bear against one another.

In a next step, the connecting seams 40, 42, 44, 46 can be produced between the two individual plates 12. The connecting seams 40, 42, 44, 46 can e.g. be weld seams, which can typically be produced by means of a laser welding method. It is thus possible, in particular, for individual plates 12 made of (metallic) sheet to be connected in a simple and sealed manner. By virtue of the fact that the connecting seams 40, 42, 44, 46 and the seals 30, 32, 34, 36 neither cross nor overlap, as shown in FIGS. 1 and 2, the connecting seams 40, 42, 44, 46 can be produced spaced apart from the seals 30, 32, 34, 36.

The bipolar plate 10 according to the invention and the method according to the invention for producing the bipolar plate 10 thus reduce rejects and manufacturing times, whereby it is possible to reduce the overall production costs of fuel cells 60.

LIST OF REFERENCE SIGNS 10 bipolar plate
12 individual plate
14 fuel side
16 oxidant side
20 fuel opening
21 cutout
22 oxidant opening
24 coolant opening
30 fuel seal
32 oxidant seal
34 coolant seal
36 fuel area seal
38 oxidant area seal
40 fuel connecting seam
42 oxidant connecting seam
44 coolant connecting seam
46 combined connecting seam
50 fuel area
60 fuel cell
62 membrane electrode assembly
64 tension element
66 end plate

The invention claimed is:

1. A bipolar plate for a fuel cell, wherein the bipolar plate has a fuel side, an oxidant side, two individual plates and a coolant cavity arranged between the individual plates, at least one of the individual plates has, on its outer face, at least one seal and the individual plates are connected by means of at least one connecting seam,
    wherein the at least one connecting seam comprises a coolant connecting seam which circumferentially encloses the coolant cavity,
    wherein the at least one connecting seam is a weld seam for sealing a gap between the individual plates of the bipolar plate,
    wherein the at least one seal comprises at least one of a fuel area seal which circumferentially encloses a fuel area on the fuel side and an oxidant area seal which circumferentially encloses an oxidant area on the oxidant side,
    wherein the at least one connecting seam neither crosses nor overlaps the at least one seal,
    wherein at least one fuel opening which passes through the bipolar plate is provided, wherein the at least one seal further comprises at least one fuel seal arranged at least on the oxidant side and the at least one connecting seam further comprises at least one fuel connecting seam, and
    wherein the at least one fuel opening is circumferentially enclosed by the at least one fuel seal, the at least one fuel seal is circumferentially enclosed by the at least one fuel connecting seam and the at least one fuel connecting seam is circumferentially enclosed by the oxidant area seal and the fuel area seal.

2. The bipolar plate as claimed in claim 1, wherein the bipolar plate has:
    at least one oxidant opening which passes through the bipolar plate, wherein the at least one seal further comprises at least one oxidant seal arranged at least on the fuel side, the at least one connecting seam further comprises at least one oxidant connecting seam, and the at least one oxidant opening is circumferentially enclosed by the at least one oxidant seal, the at least one oxidant seal is circumferentially enclosed by the at least one oxidant connecting seam and the at least one oxidant connecting seam is circumferentially enclosed by the oxidant area seal and the fuel area seal; and
    at least one coolant opening which passes through the bipolar plate and which is fluidically connected to the coolant cavity, wherein the at least one seal further comprises coolant seals arranged on both sides of the bipolar plate, which circumferentially enclose the at least one coolant opening.

3. The bipolar plate as claimed in claim 2, wherein the coolant connecting seam circumferentially encloses the coolant seals of the at least one coolant opening.

4. The bipolar plate as claimed in claim 3, wherein the coolant connecting seam circumferentially encloses at least one of the area seals.

5. The bipolar plate as claimed in claim 4, wherein the coolant seals of at least one coolant opening are arranged outside the at least one circumferentially enclosed area seal.

6. The bipolar plate as claimed in claim 3, wherein at least one of the area seals circumferentially encloses the coolant connecting seam and the coolant connecting seam is made integrally with at least one of the fuel connecting seams and/or with at least one of the oxidant connecting seams as a combined connecting seam.

7. A fuel cell comprising at least one bipolar plate as claimed in claim 1, and at least two membrane electrode assemblies, wherein the bipolar plate is arranged between the membrane electrode assemblies.

8. A method for producing a bipolar plate as claimed in claim 1, comprising the following steps:
producing seals on the individual plates;
producing connecting seams between the individual plates.

9. The method as claimed in claim 8, wherein the production of the seals takes place temporally prior to the production of the connecting seams.

10. A bipolar plate for a fuel cell, wherein the bipolar plate has a fuel side, an oxidant side, two individual plates and a coolant cavity arranged between the individual plates, at least one of the individual plates has, on its outer face, at least one seal and the individual plates are connected by means of at least one connecting seam,
wherein the at least one connecting seam comprises a coolant connecting seam which circumferentially encloses the coolant cavity,
wherein the at least one seal comprises at least one of a fuel area seal which circumferentially encloses a fuel area on the fuel side and an oxidant area seal which circumferentially encloses an oxidant area on the oxidant side,
wherein the at least one connecting seam neither crosses nor overlaps the at least one seal,
wherein the bipolar plate has:
at least one fuel opening which passes through the bipolar plate, wherein the at least one seal comprises at least one fuel seal arranged at least on the oxidant side, the at least one connecting seam comprises at least one fuel connecting seam, and the at least one fuel opening is circumferentially enclosed by the at least one fuel seal and the at least one fuel connecting seam;
at least one oxidant opening which passes through the bipolar plate, wherein the at least one seal comprises at least one oxidant seal arranged at least on the fuel side, the at least one connecting seam comprises at least one oxidant connecting seam, and the at least one oxidant opening is circumferentially enclosed by the at least one oxidant seal and the at least one oxidant connecting seam; and
at least one coolant opening which passes through the bipolar plate and which is fluidically connected to the coolant cavity, wherein the at least one seal comprises coolant seals arranged on both sides of the bipolar plate, which circumferentially enclose the at least one coolant opening;
wherein the at least one seal further comprises at least one additional fuel seal which circumferentially encloses the at least one fuel opening on the fuel side and the at least one additional fuel seal is arranged between the at least one fuel connecting seam and the at least one fuel opening, and between the least one additional fuel seal and the fuel connecting seam there is arranged at least one cutout which passes through the individual plate on the fuel side, and
wherein the at least one seal further comprises at least one additional oxidant seal which circumferentially encloses the at least one oxidant opening on the oxidant side and the at least one additional oxidant seal is arranged between the at least one oxidant connecting seam and the at least one oxidant opening, and between the at least one additional oxidant seal and the oxidant connecting seam there is arranged at least one cutout which passes through the individual plate on the oxidant side.

* * * * *